United States Patent [19]
Pett et al.

[11] 3,781,172
[45] Dec. 25, 1973

[54] PROCESS FOR THE MANUFACTURE OF MICROCRYSTALLINE FUSED ABRASIVES

[76] Inventors: Edgar A. Pett, 410 Main St.; Gordon Kinney, 364 Church St., both of Chippawa, Ontario, Canada

[22] Filed: Dec. 14, 1970

[21] Appl. No.: 98,014

Related U.S. Application Data

[63] Continuation-in-part of Ser. No. 720,082, April 10, 1968, abandoned.

[52] U.S. Cl........................ 51/309, 51/293, 264/37, 264/60
[51] Int. Cl............................................... C09c 1/68
[58] Field of Search ................ 51/309, 293; 106/57, 106/65; 65/66, 374, 99; 264/60, 66, 56, 37

[56] References Cited
UNITED STATES PATENTS

| | | | |
|---|---|---|---|
| 2,069,731 | 2/1937 | Trumpler | 51/293 |
| 3,567,413 | 3/1971 | Miller | 51/293 |
| 1,234,905 | 7/1917 | Kalmus | 51/309.1 |
| 1,728,350 | 9/1929 | Littleton | 65/374 |
| 3,377,660 | 4/1968 | Marshall et al. | 65/99 |
| 3,181,939 | 5/1965 | Marshall et al. | 51/309 |
| 3,156,545 | 11/1964 | Kistler et al. | 51/309 |
| 3,175,894 | 3/1965 | Foot | 51/309 |
| 1,240,490 | 9/1917 | Saunders et al. | 51/309.1 |
| 1,240,491 | 9/1917 | Saunders | 51/309.1 |

*Primary Examiner*—Donald J. Arnold
*Attorney*—Rufus M. Franklin

[57] ABSTRACT

A method of manufacturing fused microcrystalline abrasives which comprises pouring a molten abrasive composition over relatively cold lumps of abrasive material of essentially the same composition and of approximately the same degree of microcrystallinity as is desired in the final product. The poured melt freezes very rapidly in the interstices formed by said lumps, and at such a rate that the frozen melt possesses such a high degree of microcrystallinity that the resultant numerical average crystal size is less than 50 microns.

6 Claims, 2 Drawing Figures

3,781,172

PROCESS FOR THE MANUFACTURE OF MICROCRYSTALLINE FUSED ABRASIVES

This is a continuation-in-part of application Ser. No. 720,082 filed Apr. 10, 1968, now abandoned.

BACKGROUND OF THE INVENTION

This invention relates to an improved process for the manufacture of fused microcrystalline abrasives. A microcrystalline abrasive is defined as a crystalline abrasive with a numerical average crystal size of less than 300 microns.

The manufacture of fused microcrystalline abrasives as taught by prior art consists fundamentally of three steps, namely, fusion, casting, and comminution. In the fusion step of the process, refractory materials containing alumina, zirconia or mixtures thereof, such as bauxite, zirconia sand, the spinels, emery, clay or the like are charged to a fusion furnace of the casting type, alone or in combination with each other or in combination with reducing agents like carbon or other additives, and are made molten. A preferred type of casting furnace is the electric arc type described in U.S. Pat. No. 2,426,643 to Ridgway, wherein is described a continual process for fusing and casting abrasive compositions. The casting phase of the process is equally well known. In this step of the process, the molten abrasive composition is poured into molds of which there are a variety, for example, graphite lined slab molds into which is poured a layer of molten abrasive composition 5 or 6 inches thick, cast iron ingot molds in a variety of sizes typical of which will accept a charge of molten matter ranging from 25 to 300 pounds. This phase of the process is used to control the crystal size of the final abrasive product; the smaller the mass of the cast material and the more effectively the mold setup cools the molten mass, the finer will be the crystallinity of the final abrasive products. The effect of rapid cooling on the crystalline character of the abrasive resulting from the use of various sizes of molds, and the phenomenon of increasing strength of grain with decreasing average crystal size is thoroughly described in U.S. Pat. No. 3,181,939 to Marshall and others. This reference clearly points out that materials which are inclined to crystallize upon solidification from the molten state, form increasingly smaller crystals as the rate of dissipation of heat increases. The third step in the process of manufacturing abrasives for commercial use is that of comminution or crushing. A variety of equipment is used for this purpose including jaw crushers, ball mills, hammer mills, and roll crushers. A desirable method, particularly for the production of high impact strength, finely crystalline abrasives, is impact crushing. A method of this type is described in the German Pat. No. 506,517 dated Dec. 1, 1928. The fundamental principle of impact crushing involves subjecting the material to be comminuted to a single high energy impact which results in sharp fractures at crystal faces and at macro and micro flaws in the solid structure. The abrasive is subjected to as many repeated single impacts as necessary in order to produce abrasive grain of the desired mesh size and shape. Further, the abrasive grain which is produced by impact crushing is inherently stronger than abrasives produced by other comminution methods because impact crushing destroys the weak phases in the crude material with only the strongest phases of the material surviving the number of single impacts needed to reduce the abrasive to the desirable grit sizes, particularly when the grit sizes of interest are the coarse mesh sizes, for example, mesh sizes 4 to 24, to be used for rough grinding or snagging operations. A suitable impact crushing machine is disclosed in the U.S. Pat. No. 3,103,317 to Patinson. Despite the major contributions to the art made by the abovedescribed process innovations, they do contain the following disadvantages:

1. The best small mold casting techniques are incapable of producing abrasives with an average crystal size range below 50 microns.
2. The combination of the best fusion, casting, and the ultimate known comminution method, i.e. impact crushing, results in relatively low yields of the desirable high impact strength microcrystalline abrasive, and
3. The relatively low production rate which results from the necessity of using ingot molds with a maximum capacity of 300 pounds in order to produce crystallinity less than 300 microns.

These disadvantages are significantly improved upon by the practice of this invention, to be disclosed in detail forthwith.

SUMMARY OF THE INVENTION

This invention is a new casting technique which consists essentially of casting molten abrasive compositions on prefabricated lumps of essentially the same composition, said lumps functioning as cooling media. This technique is used in conjunction with known fusion and crushing methods, to produce fused microcrystalline abrasives in yields in excess of the yields resulting from the casting methods of the prior art, and at a production rate surpassing that of known methods and production. This novel casting technique, as compared to prior art, provides a method for efficiently and effectively cooling a molten abrasive composition which as a result, produces a finer crystalline material and therefore an abrasive with higher impact strength. Furthremore, increased yields of the known microcrystalline abrasives result from the practice of this invention by virtue of the increased cooling efficiency provided by the lump casting method, which results in a higher total percentage, of the original molten mass, being rendered microcrystalline. Furthermore still, the now existing production rate of microcrystalline abrasives is significantly increased by the lump casting concept, by virtue of the fact that very large molds or receptacles, partially filled with solid lumps can be filled uninterruptedly, pouring, in a given period of time, more molten abrasive mix than can be poured in the same time period into the 300 pound molds. Present practice is restricted to molds with a maximum capacity of 300 pounds because molten masses any larger cool so slowly as to result in crude abrasive that is not microcrystalline, that is, with a numerical average crystal size greater than 300 microns. Another known method of producing microcrystalline abrasives is the casting of a molten abrasive composition onto a cooling surface in a thin layer. This method is capable of producing very finely crystalline materials but the yields of final product is low because of the surface foam which is generated when the molten composition is cast into a thin slab. Because of the thinness of the slab, the foamed surface thereof represents a large percentage of the total cast slab. This foam portion is very weak and is essentially converted to dust by the granulating process employed to comminute the large pieces of the slab to the desired abrasive grit sizes.

DESCRIPTION OF THE PREFERRED EMBODIMENTS

It is an objective of this invention to provide a novel casting process for the manufacture of essentially non-porous microcrystalline fused abrasives in high yield.

It is another objective of this invention to provide a more efficient method of casting fused microcrystalline abrasives.

Figure 1:
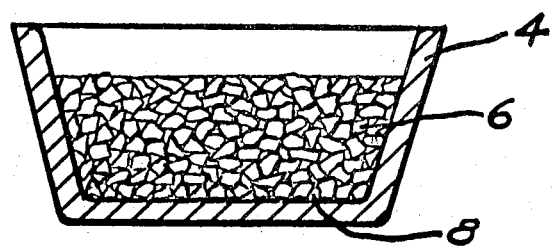
FIG. 1 is a sectional view of a mold which is partially filled with lumps.
Figure 2:
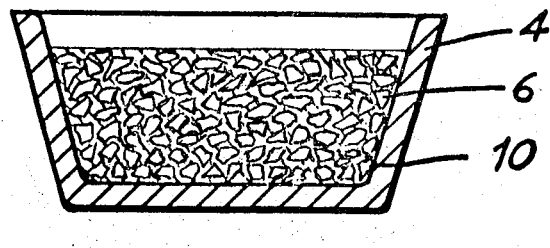
FIG. 2 is a sectional view of the partially lump filled mold of FIG. 1, after casting a molten abrasive composition onto the bed of lumps.

The process of this invention increases the yield of the high strength, microcrystalline phase of known abrasive compositions. An electric arc casting furnace is charged with any suitable refractory mix, which commonly comprises bauxite, Bayer process alumina, zircon, zirconia, and the like, alone or in combination with each other, plus any desirable or necessary additives such as calcium oxide, carbon, iron oxide, titania, etc. The furnace charge is made molten and held in that state for a period of time sufficient to allow the desired physical and chemical reactions to take place. At this point, the molten abrasive composition is ready to cast. The melt, maintained sufficiently above it's freezing point to assure it's fluidity, is then poured into a bed of prefabricated solid lumps, as shown in FIG. 1 where the lumps 6 and the resulting interstices 8, are confined in the container 4, the lumps being of essentially the same composition as that of the melt, said lumps ranging in size from one-fourth inch to two inches, and in an intermixed melt to lump ratio of between 0.35 and 0.7, with little or no melt over and above the level of the lumps. The lump size range of one-fourth inch to 2 inches is necessary if the crystal size of the material being produced in high yield is to be about 50 microns or less. The melt freezes rapidly in the interstices of the bed of lumps, said interstices varying in diameter of from one-fourth inch to three-fourths inch, the final mass then having the appearance as shown in FIG. 2 where the frozen melt 10 can be seen in the interstices formed by the lumps 6, all contained in the mold or container 4. The entire mass is then dumped from the mold and allowed to cool sufficiently to handle. The cooled material is then broken up into large lumps, rough crushed in a jaw crusher, reduced further by roll crushing, and subjected to the impact crushing process to affect the comminution to abrasive material of commercially usable mesh sizes. When a typical fused 95 percent alumina abrasive is lump cast in the manner described, the yield of high strength microcrystalline abrasive which survives the comminution phase of the process, is about 65 percent as compared to only about 45 percent when the identical fused 95 percent alumina abrasive is cast into solid ingots as taught by prior art. This represents an increase in yield of the desirable high strength microcrystalline abrasive of about 44.5 percent.

The temperature of the lumps plays an important roll in the successful practice of the invention. In all cases the temperature of the lumps must be relatively cold as compared to the temperature of the melt. By relatively cold is meant sufficiently lacking in heat content so as to have a heat absorption capacity great enough to absorb heat from the melt in such a quantity and at such a rate that growth of any substantial quantity of crystals greater than 300 microns is thus avoided. The preferred lump temperature is ambient temperture, e.g., 15° - 30°C (60° - 85°F). This of course does not preclude using colder lumps which would even improve the efficiency of the process. Nor does it preclude the use of somewhat heated lumps so long as the heat absorption capacity of the warmed lumps is not so diminished as to make the lumps incapable of absorbing heat from the melt rapidly enough and in sufficient quantity to prevent crystal growth in excess of 300 microns. For example, lumps may be 200° - 300° C, when the melt, at perhaps 2,000°C, is cast thereon. If the warm lumps are present in sufficient quantity, then cooling of the melt would be rapid enough to prevent crystal growth in excess of 300 microns. The combination of lump temperature and lump quantity must be such as to cause a rapid drop in the temperature of the melt to at least below the annealing temperature of the abrasive composition to insure minimum crystal growth.

The average crystal size of the lumps is also important. If a final product with an average crystal size of a significantly less than 300 microns is desired, then the average crystal size of the lump material should be below 300 microns or at least not so much in excess thereof as to result in a comminuted mixture of lumps and frozen melt with an average crystal size in excess of 300 microns. Preferably the casting process is initiated by first preparing finely microcrystalline lumps of a given desired composition by one of the less efficient methods e.g., casting of the melt on a slab. This will provide a quantity of finely crystalline material for the first lump casting run. Thereafter, some of the product of the first run is retained as lumps to be used in subsequent lump casting runs. Alternatively, finely microcrystalline lump material may be generated by first casting a given composition into ingot molds which will result in material with a rather coarse crystal size and then subsequently casting a melt of the same composition onto lumps of this coarser crystalline material thereby reducing the average crystal size of the lump-frozen melt mixture. This may be repeated if the average crystal size of the mixture is not well below 300 microns.

A further advantage for the lump casting process is found in the discovery that when the lump casting technique is utilized for the casting of crude microcrystalline abrasive when the crystal size realm desired is about 150 – 300 microns, the restriction of the prior art no longer exists wherein the size of the cast ingot must be a maximum of about 300 pounds in order to produce crystallinity below 300 microns; this limitation in ingot size adversely affects the rate of production. Old art small ingot casting techniques require that the casting furnace tapping spout be relatively small to facilitate casting into the small molds, thereby restricting the pouring rate. Further, substantial non-productive furnace time must be consumed, interrupting the pouring after having poured only about 300 pounds of melt in order to back the furnace to the non-pouring position or to plug the tap hole, in order to remove the filled mold and replace it with an empty one. Now, by appling the principle of this invention, molds of relatively large capacity, of the order of 10,000 pounds or more, can be used. Such large molds are partially filled with solid lumps ranging in size from 2 inches to 24 inches, but preferably from 12 inches to about 24 inches, of a material essentially the same in composition to the melt to be cast. The furnace may then be tilted to the pouring position or the tap hole opened and a large quantity of melt poured without interruption. A mold with a capacity of 10,000 pounds will accept without interruption from about 2,600 to about 4,100 pounds of melt depending on the ratio of the mass of melt to the mass of lumps. In order to produce a crude abrasive below the defined microcrystalline upper limit of 300 microns, the the mass of melt to mass of lump ratio should be kept between about 0.35 and about 2.5 preferably about 1.0. From the foregoing, it can be readily seen, that the rate of production of the crude microcrystalline abrasive is very significantly increased, and that the time required to complete a furnace run is reduced thereby reducing the cost and increasing the efficiency of the furnacing phase of the operation.

It should be noted that the relative weight of lumps to melt cannot fall substantially below where the weight ratio of lumps to melt is 0.35. If a lesser amount of lumps is employed, they will of course, have a significant cooling effect on the melt but not of adequate proportions to produce the desired finer than 300 micron final product. For example if one chose to use 15 parts by weight of lumps to 100 parts by weight of melt, the presence of the lumps will accelerate cooling of the melt to some degree but not to such a degree as to result in the ultra finely crystalline material which results from using at least about 35 parts by weight of lumps to 100 parts by weight of melt.

The size of the mold, or receptacle, which initially holds the lumps to be cast upon, and ultimately contains the intermixture of frozen melt and lumps, is relatively unimportant to the successful practice of this invention. The most important facet here, is the combination of the size of the lumps employed and the thickness of the bed of lumps. For optimum utilization of a bed of lumps of a given size range, the thickness of the bed should not be such that the poured melt freezes before it has penetrated essentially the full depth of the bed. Therefore, the shape of the mold or receptacle is of some importance, despite the fact that size, per se, is not. The preferred mold shape is like that of the FIGS. 1 and 2, where the ratio of the horizontal to the vertical dimension is approximately equal to or greater than 2. However, where large enough lumps are used, even the shape of the mold is of no importance.

The following are detailed examples of the practice of the preferred embodiments of this invention. The details of the fusion method used are not included because they are not pertinent to the essence or understanding of the invention disclosed herein. Suffice to say that all that is required of the fusion operation here, is that it be done in a casting type furnace, preferably of the type described by Ridgway in his U.S. Pat. No. 2,426,643. Similarly, detailed descriptions of the various methods of comminution are not included. However, for the comminution of the microcrystalline abrasive with which this invention is primarily concerned, the impact crushing method is preferred.

Furthermore, it is well known to those skilled in the art, that for certain rough grinding applications, e.g., high pressure snagging of stainless steel billets, so called mulling or dry-panning of abrasives (after the crushing operations), can be dangerous. Mulling or dry-panning abrasives wears or breaks off the relatively weak corners on the abrasive particles thereby producing, (1) a blockier shape as evidenced by an increase in the weight-per-cubic-foot of the abrasive and, (2) a stronger abrasive as indicated by the resultant increase in impact strength. It follows then that the impact strength of the abrasives of this invention can be further improved by mulling, which, in fact, was done in the case of the abrasive in the billet grinding test, described subsequently in Example B.

EXAMPLE A

An electric arc casting furnace with a capacity of 2,000 pounds was charged with 1929 pounds of Bauxite, 5 pounds of Ilmenite, and 66 pounds of coal; the mixture was fused to a molten condition, i.e., to about 2000°C, and held in this state for a period of time sufficient to allow the normal chemical and physical reactions to take place. When the reactivity within the molten mass had subsided, about 1,000 pounds of the melt was poured into conventional tapered cast iron ingot molds, each mold having a capacity of about 300 pounds and measuring 24 inches in width, 24 inches in breadth and 21 inches in depth. The remaining melt in the furnace was poured into molds identical to the aforementioned 300 pound molds, but these molds were approximately filled with lumps of material ranging in size of from 1 to 2 inches and of the same composition as that of the melt. The poured melt flowed down into the interstices formed by the lumps, and the pouring in a given mold was stopped when the level of the melt reached about the level of the lumps, with a resulting melt to lump ratio of about 0.5. The melt cast onto the lumps was observed to freeze almost instantaneously.

At this point both pourings were removed from their respective molds. The material which had been cast on the lumps was rough crushed by using a combination of jaw crushing and roll crushing, until all the material would pass through a screen with three-eighths inch openings, but would not pass through an 18 mesh screen. This rough crushed material was then subjected to 6 crushing passes and 6 shaping passes in an impact crusher. The abrasive was collected that passed through a 4 mesh screen, but remained on an 18 mesh screen.

The melt cast in the conventional manner, i.e., into the empty cast iron 300 pound molds, was subjected to the same processing steps as the lump cast material, in order to produce the through 4 and on 18 mesh abrasive.

The quantities of the alumina abrasives produced by the two casting methods were then analyzed for percent yield and average crystal size; the results of the analyses were as shown in Table I.

TABLE I

| Casting Method | Yield | Average Crystal Size |
|---|---|---|
| Conventional Ingot Casting | 45% | 350 microns |
| Lump Casting | 65% | 53 microns |

The principal benefits realized by the rapid cooling of the melt, facilitated by lump casting are the very pronounced decrease in the average crystal size of the resulting abrasive and the large increase in the yield.

EXAMPLE B

A high impact strength, ultra finely microcrystalline zirconia-alumina abrasive, was prepared by charging a 2,000 pound capacity electric arc casting furnace with 856 pounds of Bauxite, 342 pounds of zircon sand, 514 pounds of fine mesh fused abrasive composed of essentially 75 percent alpha-alumina and 25 percent zirconia, 5 pounds of magnesium oxide, 151 pounds of iron borings, and 132 pounds of coal. The mixture was made molten and held in that state until reactivity subsided.

The molten mix was then cast into tapered cast iron molds measuring on the outside about 12 inches in width, 24 inches in breadth and 10 inches in depth, essentially filled with lumps ranging in size from one-half inch to 2 inches, said lumps having the same compositions as that of the melt, with a resultant melt-to-lump ratio equal to about 1; these molds had a capacity of about 80 pounds of solid mass. The melt fully penetrated the bed of lumps filling the interstices formed by the lumps; the molten phase solidified almost instantaneously.

When the admixture of lumps and solidified melt had cooled sufficiently to handle, it was removed from the molds and fed to a jaw crusher, where the now crude microcrystalline abrasive was reduced to pieces of 2 inches in diameter or less. That fraction of the crude abrasive ranging in size of from one-half inch to 2 inches was removed from the finer-than-one-half-inch material, for future use as lump casting media. The finer-than-one-half-inch fraction was then subjected to six passes through an impact crusher to reduce the particle size further to pass through a 4 mesh screen, followed by eight additional passes through the impact crusher to impart to the abrasive a stronger, blocky shape. The shaped abrasive was then screened to collect the finished abrasive between 4 and 18 mesh.

This abrasive was then evaluated with respect to average crystal size, impact strength, and grinding performance in a phenolic resin bonded wheel, floor-stand grinding steel castings. The resulting properties of this new abrasive were compared with those of the highly regarded type of 40 percent zirconia, 60 percent alumina mulled abrasive disclosed in U.S. Pat. No. 3,181,939 to Marshall and Roschuk. The results of this comparison are shown in Table II. The number appearing in the Impact Strength column for a given abrasive represents the percentage of a given amount of 12 mesh abrasive, that remained relatively unchanged in size after subjecting the sample of abrasive to high energy impacting for a fixd time. Therefore, the greater the inherent strength of the abrasive grains, the greater is the resultant Impact Strength number. The wheel wear rates (Ww) and material removal rates (MR) are given in cbuc inches per hour and pounds per hour respectively, with the ultimate quality, B.B. Grinding Quality, of the grinding wheel (and abrasive contained therin) being represented by the following relationship of material removal rate to wheel wear rate:

B.B. Grinding Quality = $(MR)^2/(Ww)$

Table II

| Abrasive Type | Av. Crystal Size microns | Impact Strength | Wheel Wear Ww | Metal Removal MR | B.B Grinding Quality |
|---|---|---|---|---|---|
| ingot cast* 40% ZrO$_2$ mulled | 130 | 38.7% | 57.7 in.$^3$/hr. | 26.2 lbs/hr. | 11.9 |
| lump cast* 25% ZrO$_2$ unmulled | 22 | 46.3% | 62.0 in.$^3$/hr. | 57.4 lbs/hr. | 53.1 |

*Wheels identical except for abrasive

The wheels used in the grinding test were 24 × 2 × 12 inches and of the so-called cold pressed type of medium hardness, typical of those used in foundries for floor-stand snagging. The grinding conditions were: wheel speed – 11,000 surface feet per minute, grinding pressure — 300 psi, grinding time — 1 hour, material ground — cast steel.

The lump cast abrasive with its finer average crystal size was significantly superior in impact strength and grossly superior in B.B. Grinding Quality, to the 40 percent ZrO$_2$ ingot cast abrasive, despite the facts that the latter had been mulled after comminution, and, as pointed out in the Marshall et al. U.S. Pat. No. 3,181,939, the abrasive with the highest B.B. Grinding Quality of the ingot cast ZrO$_2$-Al$_2$O$_3$ abrasives is usually that containing about 40 percent ZrO$_2$, with the B.B. Grinding Quality decreasing as the content of the ZrO$_2$ decreases.

The cold pressed wheels used in this test were manufactured in the conventional manner by mixing specific weights of abrasive and bonding agent (consisting of 75 percent by weight of BRP–5417, phenol-formaldehyde resin manufactured by Union Carbide Corporation, and 25 percent by weight of an inorganic filler), placing a prescribed amount of the abrasive bond mixture in a 24 inch steel mold with top and bottom plates, and pressing the mixture at room temperature to a volume structure of:

|  | Volume % |
|---|---|
| Abrasive | 54 |
| Bond | 24 |
| Porosity | 22 |

The wheels made in this manner were then heat treated in a circulating air oven in the conventional manner in order to cure the phenol-formaldehyde resin binder.

This volume structure poroduced in the case of the 40 percent ZrO$_2$ abrasive, a wheel with a specific gravity of 2.87 grams/cm$^3$ because this abrasive had a Specific Gravity of 4.56 grams/cm$^3$. The wheel containing the lump cast 25 percent ZrO$_2$ abrasive had a Specific Gravity of 2.75 grams/cm$^3$ as a result of the 4.34 grams/cm$^3$ Specific Gravity of this abrasive.

The volume structure composition of a so-called cold pressed grinding wheel controls the hardness and strength of the wheel. It is obvious that there is almost an infinite number of volume percent combinations of abrasive, bond and porosity. There are however, some very practical limitations. When the volume percent of bond drops below 2 percent the resultant wheels are too weak to use even at very low grinding speeds. At the opposite end of the spectrum the volume percent of abrasive cannot much exceed 68 percent because the packing characteristics of abrasive are such that about 68 percent by volume is the maximum amount of abrasive that can be packed in a given volume of space. The most useful volume structure range for the cold pressed type of wheel is from:

Volume %

Abrasive 54
Bond 8
Porosity 38 to about:

| | Volume % |
|---|---|
| Abrasive | 46 |
| Bond | 42 |
| Porosity | 12 |

Compositions on either side of this range are either extremely weak or very difficult to make.

EXAMPLE C

Additional high impact strength, ultra finely microcrystalline abrasive like that of Example B was prepared in the exact manner described in the said example. However, after this batch of abrasive had been impact shaped and the 4 to 18 mesh abrasive segregated, it was mulled for 15 minutes thereby making the shape somewhat blockier and increasing the impact strength.

This lump cast mulled abrasive was then evaluated, side by side with ingot cast 40 percent $ZrO_2$ abrasive identical to that of Example B, with respect to average crystal size, impact strength, and grinding performance in extremely hard phenolic resin bonded wheels, swing-frame grinding stainless steel billets. The results are contained in Table III.

Table III

| Abrasive Type | Av. Crystal Size microns | Impact Strength | Wheel Wear Ww | Metal Removal MR | B.B Grinding Quality |
|---|---|---|---|---|---|
| ingot cast* 40% $ZrO_2$ mulled | 130 | 38.7% | 37.4 in.³/hr. in.³/hr. | 145 lbs/hr. | 560 |
| lump cast* 25% $ZrO_2$ mulled | 24 | 54.4% | 26.7 in.³/hr. in.³/hr. | 171 lbs/hr. | 1095 |

*Wheels identical except for abrasive

The wheels used in the grinding test were 16 × 2 × 6 inches and of the very hard hot pressed type, typical of those used in steel mills for high speed, high pressure, swing-frame grinding of steel billets. The grinding conditions were: wheel speed — 9,500 surface feet per minute, grinding force — 400 pounds, grinding time - 1 hour, material ground – 18-8 stainless steel.

The lump cast 25 percent $ZrO_2$ abrasive after mulling was superior to the mulled 40 percent $ZrO_2$ abrasive, in impact strength and B.B. Grinding Quality, both as defined in Example B.

It is apparent from the teachings of the Marshall et al. in U.S. Pat. No. 3,181,939 and this invention that the lump casting method when applied to the manufacture of a fused $ZrO_2$-$Al_2O_3$ abrasive of any particular $ZrO_2$ content from 10–60 percent would produce a more finely crystalline and therefore a superior abrasive, to abrasive of the same composition made by the ingot casting technique.

The wheels of this test were manufactured by a hot pressing technique, commonly used to produce extremely hard essentially non-porous wheels. Despite the effectiveness of this pressing technique and the frequently used nomenclature of "zero porosity," when referring to products of this type, they are seldom 100 percent free of porosity; in actuality, these products usually contain about 1–2 percent porosity.

Specific amounts of abrasive and bonding agent (consisting of 26.9 percent by weight of BRP–5417 and 73.1 percent by weight of mixed fillers) were mixed together, a particular amount of this mixture was placed in a 16 inch steel mold with top and bottom plates, and the mixture then compressed in a press with decks heated to about 160°C. This hot pressing at 4–6 tons per square inch was continued for about 1 hour after which the partially heat cured wheel was removed from the press and placed in a circulating air oven and the wheel given a convention heat treatment to complete the cure of the phenolic resin bond.

These wheels had a theoretical volume structure of:

| | Volume % |
|---|---|
| Abrasive | 60 |
| Bond | 40 |
| Porosity | 0 |

The actual porosity however was about 1.5 percent. The wheel made in this manner with the 40 percent $ZrO_2$ abrasive had a Specific Gravity of 3.63 grams/cm³ and the wheel made with the lump cast mulled 25 percent $ZrO_2$ abrasive had a Specific Gravity of 3.50 grams/cm³, again as a result of differences in Specific Gravities of the abrasive.

Wheels of the hot pressed type, so-called zero porosity, can be made in a reasonably wide volume structure range, however the most useful range of this product type is from:

| | Volume % |
|---|---|
| Abrasive | 60 |
| Bond | 40 |
| Porosity | 0 | to about:

| | Volume % |
|---|---|
| Abrasive | 50 |
| Bond | 50 |
| Porosity | 0 |

EXAMPLE D

The lump casting process was also carried out, casting an essentially aluminous melt into very large molds with outside dimensions of 6 feet in diameter by 6 feet deep, with a capacity of about 10,000 pounds. This produced a microcrystalline abrasive in the 200–300 micron range whereas casting into a mold of this size without the lumps or using a batch type furnace like that described by J. A. Upper in "The Manufacture of Abrasives," Journal of Chemical Education, December 1949, No. 12, pp. 676 to 680, results in abrasive with an average crystal size well in excess of 400 microns. It reduced the time to pour a full furnace containing 10,000 pounds of melt, by about 50 percent as compared to casting into a large number of the small empty 300 pound molds, and also reduced the amount of handling time of the crude abrasive by virtue of there being only two large ingots versus a large number of small ingots.

The large mold adaptation of the lump casting process was carried out by charging a 10,000 pound electric arc casting furnace with 9,645 pounds of Bauxite, 25 pounds of Ilmenite, and 330 pounds of coal. The mixture was fused to a molten condition and held in this state for a period of time sufficient to allow all the normal chemical and physical reactions to take place. The molten furnace charge was then rapidly emptied into two 10,000 pound capacity refractory-brick lined tapered steel shell molds that were filled with lumps 8 to 18 inches in diameter and of the same composition as the melt. The melt to lump ratio was about 1.

A subsequent pouring run in the fully charged 10,000 pound electric arc casting furnace, wherein the melt was cast into relatively small 300 pound ingot molds necessitated the use of 35 individual molds in order to discharge the furnace.

These crude abrasives were then comminuted by the well known processes of jaw crushing and roll crushing.

All the crude abrasive need not be crushed down to abrasive particles of 8 mesh and finer, for use in grinding wheels or as blasting media. Some portion, or even all of the crude abrasive, may be reduced to a size range of 0.1 to 2 inches for use as random-shape tumbling media.

What is claimed is:

1. A method for producing microcrystalline fused abrasive grain from an abrasive composition consisting essentially of an abrasive material selected from the group consisting of alumina, zirconia, and alloys thereof with each other and with other metal oxides comprising the steps of melting said composition and pouring said molten abrasive composition on a cooling bed of lumps of material ranging in size from one-fourth inch to 24 inches, said lumps being microcrystalline in nature having a crystal size less than 300 microns and of essentially the same composition as lumps made by crushing and recycling the frozen molten abrasive composition, said lumps being cold relative to the temperature of said molten abrasive composition at the time of pouring of said molten abrasive composition, the relatively cold temperature and quantity of said lumps being such as to facilitate the absorption of heat from said molten abrasive composition at such a rapid cooling rate that the frozen melt has a crystal size less than 300 microns, said amount of said lumps being such that the ratio of the mass of lumps to that of the molten abrasive is between 0.35 and 2.5, the amount of molten abrasive poured on said bed being no more than just enough to cover said bed of lumps and crushing said frozen mixture of microcrystalline lumps and molten abrasive composition to abrasive grain.

2. The process of claim 1 wherein said molten abrasive composition consists essentially of 10 to 60 percent by weight of zirconia and 40 to 90 percent weight of alumina.

3. The process of claim 2 wherein said relatively cold temperature of said lumps is ambient temperature.

4. The process of claim 2 wherein said mixture of frozen molten abrasive composition and lumps is rough crushed followed by screening out of the lumps in the size range of one-fourth inch to 24 inches for use as a cooling bed for subsequent pourings of molten abrasive composition.

5. The process of claim 2 wherein the size range of the lumps used is from 2 inches to 24 inches.

6. The process of claim 2 wherein the size range of the lumps used is from one-fourth inch to 2 inches.

* * * * *